United States Patent
Mohite et al.

(10) Patent No.: US 12,087,052 B2
(45) Date of Patent: Sep. 10, 2024

(54) METHOD AND SYSTEM FOR CROP LOSS ESTIMATION

(71) Applicant: Tata Consultancy Services Limited, Mumbai (IN)

(72) Inventors: Jayantrao Mohite, Thane (IN); Suryakant Ashok Sawant, Thane (IN); Srinivasu Pappula, Hyderabad (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 214 days.

(21) Appl. No.: 17/756,073

(22) PCT Filed: Mar. 22, 2021

(86) PCT No.: PCT/IB2021/052360
§ 371 (c)(1),
(2) Date: May 16, 2022

(87) PCT Pub. No.: WO2021/191772
PCT Pub. Date: Sep. 30, 2021

(65) Prior Publication Data
US 2023/0005259 A1    Jan. 5, 2023

(30) Foreign Application Priority Data
Mar. 26, 2020   (IN) .............................. 202021013244

(51) Int. Cl.
*G06K 9/00*    (2022.01)
*G06V 10/25*   (2022.01)
(Continued)

(52) U.S. Cl.
CPC ............ *G06V 20/188* (2022.01); *G06V 10/25* (2022.01); *G06V 10/751* (2022.01); *G06V 20/13* (2022.01)

(58) Field of Classification Search
None
See application file for complete search history.

(56) References Cited

U.S. PATENT DOCUMENTS 9,213,905 B2   12/2015  Lange et al.
10,762,584 B2   9/2020  Fleming et al.
(Continued)

FOREIGN PATENT DOCUMENTS

CN    104881727 A    9/2015
CN    108615105 A   10/2018

OTHER PUBLICATIONS

Lowe, Amy et al., "Hyperspectral image analysis techniques for the detection and classification of the early onset of plant disease and stress", Plant Methods, Date: 2017, vol. 13 (1), Publisher: NCBI, https://plantmethods.biomedcentral.com/track/pdf/10.1186/s13007-017-0233-z.pdf.

(Continued)

*Primary Examiner* — Sj Park
(74) *Attorney, Agent, or Firm* — FINNEGAN, HENDERSON, FARABOW, GARRETT & DUNNER LLP

(57) ABSTRACT

Crop loss estimation allows a user to monitor and estimate damage to the crops due to various natural events/factors. State of the art systems used for the crop loss estimation have the disadvantage that they do not convey to the users extent of damage. In addition to this, the existing methods do not take into account the recovery factor of the crops due to multiple factors and end up in overestimating the loss. The disclosure herein generally relates to crop monitoring, and, more particularly, to a method and system for crop loss estimation. In this method, crop loss is assessed based on real-time weather parameters and remote sensing data collected and processed, and crops are classified as being in one of a repairable damage class and a permanent damage class.

(Continued)

The system also quantifies the crop loss, which allows the user to understand magnitude of the crop loss.

9 Claims, 5 Drawing Sheets

(51) Int. Cl.
   *G06V 10/75* (2022.01)
   *G06V 20/10* (2022.01)
   *G06V 20/13* (2022.01)

(56) References Cited

U.S. PATENT DOCUMENTS

| | | |
|---|---|---|
| 10,942,113 B2 | 3/2021 | Rushing et al. |
| 2012/0237083 A1 | 9/2012 | Lange et al. |
| 2017/0042098 A1 | 2/2017 | Moshelion et al. |
| 2018/0330435 A1* | 11/2018 | Garg ................. G06Q 40/03 |
| 2019/0259109 A1 | 8/2019 | Fleming et al. |
| 2019/0277749 A1 | 9/2019 | Rushing et al. |

OTHER PUBLICATIONS

Irby, Jon Trenton, "Crop stress detection and classification using hyperspectral remote sensing", Articles, Date: Jan. 2012, Publisher: adsabs, https://scholarsjunction.msstate.edu/cgi/viewcontent_cgi?article=2223&context=td.

International Search Report and Written Opinion mailed Jul. 19, 2021, in International Application No. PCT/IB2021/052360; 14 pages.

* cited by examiner

METHOD AND SYSTEM FOR CROP LOSS ESTIMATION

CROSS-REFERENCE TO RELATED APPLICATIONS AND PRIORITY

This application is an US National Stage Filing and claims priority from International Application No. PCT/IB2021/052360, filed on Mar. 22, 2021, which application claims priority from Indian Provisional Patent Application No. 202021013244 filed on Mar. 26, 2020. The entire contents of the aforementioned applications are incorporated herein by reference.

TECHNICAL FIELD

The disclosure herein generally relates to crop monitoring, and, more particularly, to a method and system for crop loss estimation.

BACKGROUND

There are different factors that affect growth or health of crops. A few examples of such factors are weather conditions, soil characteristics, region, water availability and so on. Some crops grow in hot weather conditions, some grow in cold weather conditions, some in monsoon, and so on. Even though crops are planted taking such characteristics and requirements into consideration, sudden change in climatic conditions, occurrence of any localized calamity/natural event or any such factors can still adversely affect health of the crops.

Many crop loss assessment/health monitoring systems exist in the market, and they use different approaches to monitor the crop loss/health. Image processing based crop loss estimation is an example, in which image of the crops, taken at two different time instances are compared using appropriate image processing mechanisms, to understand changes happened over a period of time. One disadvantage of the state of the art systems is that they do not convey to the users extent of damage. In addition to this, existing methods do not take into account the recovery factor of the crops due to multiple factors and end up in overestimating the loss. Also, even if there is a chance that the users can actually save the crop from complete damage, the user wouldn't know, which in turn affects the yield/results.

SUMMARY

Embodiments of the present disclosure present technological improvements as solutions to one or more of the above-mentioned technical problems recognized by the inventors in conventional systems. For example, in one embodiment, a processor implemented method for crop loss estimation is provided. The crop loss estimation is performed for each Region on Interest (ROI), which is a specific geographical area being considered. Initially, real-time information on one or more weather parameters, and one or more remote sensing indicators are collected via one or more hardware processors. Further, by processing the real-time information on the one or more weather parameters and the one or more remote sensing indicators, one or more critical time windows in at least one later time instance is determined wherein in each of the one or more critical time windows one or more crops in the ROI suffers a crop loss. Further, the crop loss in each of the one or more critical time windows is classified as one of a repairable damage and a permanent damage, via the one or more hardware processors. Further, the crop loss in each of the time windows is quantified. To quantify the crop loss, initially remote sensing time series data of at least one image of at least one hotspot in the time window for which crop loss is to be quantified is collected. Further, a time series estimator for each pixel in the at least one image is estimated, wherein the time-series estimator for a pixel is estimated using comparison of a pre-defined time-series of the pixel with a current time series of the pixel. Further, a temporal estimator for each pixel in the at least one image is estimated, wherein the temporal estimator for a pixel is estimated based on a long-term temporal average of a crop at a target pixel with a temporal data of the crop at the current pixel. Further, a spatial estimator for each pixel in the at least one image is estimated, wherein the spatial estimator for a pixel is estimated based on condition of the pixel in comparison with one or more other pixels in the image of the hotspot. The total crop loss at a hotspot is quantified as equal to weighted average of the time-series estimator, the temporal estimator, and the spatial estimator.

In another aspect, a system for crop loss estimation is provided. The system includes one or more hardware processors, one or more communication interfaces, and one or more memory storing a plurality of instructions. The plurality of instructions when executed cause the one or more hardware processors to perform the crop loss estimation for each Region on Interest (ROI). The system initially collects real-time information on one or more weather parameters and one or more remote sensing indicators. Further, by processing the real-time information on the one or more weather parameters and the one or more remote sensing indicators, one or more critical time windows in at least one later time instance is determined wherein in each of the one or more critical time windows one or more crops in the ROI suffers a crop loss. Further, the crop loss in each of the one or more critical time windows is classified as one of a repairable damage and a permanent damage, via the one or more hardware processors. Further, the crop loss in each of the time windows is quantified. To quantify the crop loss, initially remote sensing time series data of at least one image of at least one hotspot in the time window for which crop loss is to be quantified is collected. Further, a time series estimator for each pixel in the at least one image is estimated, wherein the time-series estimator for a pixel is estimated using comparison of a pre-defined time-series of the pixel with a current time series of the pixel. Further, a temporal estimator for each pixel in the at least one image is estimated, wherein the temporal estimator for a pixel is estimated based on a long-term temporal average of a crop at a target pixel with a temporal data of the crop at the current pixel. Further, a spatial estimator for each pixel in the at least one image is estimated, wherein the spatial estimator for a pixel is estimated based on condition of the pixel in comparison with one or more other pixels in the image of the hotspot. The total crop loss at a hotspot is quantified as equal to weighted average of the time-series estimator, the temporal estimator, and the spatial estimator.

In yet another aspect, a non-transitory computer readable medium for crop loss estimation is provided. The crop loss estimation is performed for each Region on Interest (ROI), which is a specific geographical area being considered. Initially, real-time information on one or more weather parameters, and one or more remote sensing indicators are collected via one or more hardware processors, by the non-transitory computer readable medium. Further, by processing the real-time information on the one or more weather parameters and the one or more remote sensing indicators, one or more critical time windows in at least one later time instance is determined wherein in each of the one or more critical time windows one or more crops in the ROI suffers a crop loss. Further, the crop loss in each of the one or more critical time windows is classified as one of a repairable damage and a permanent damage, via the one or more hardware processors. Further, the crop loss in each of the time windows is quantified. To quantify the crop loss, initially remote sensing time series data of at least one image of at least one hotspot in the time window for which crop loss is to be quantified is collected. Further, a time series estimator for each pixel in the at least one image is estimated, wherein the time-series estimator for a pixel is estimated using comparison of a pre-defined time-series of the pixel with a current time series of the pixel. Further, a temporal estimator for each pixel in the at least one image is estimated, wherein the temporal estimator for a pixel is estimated based on a long-term temporal average of a crop at a target pixel with a temporal data of the crop at the current pixel. Further, a spatial estimator for each pixel in the at least one image is estimated, wherein the spatial estimator for a pixel is estimated based on condition of the pixel in comparison with one or more other pixels in the image of the hotspot. The total crop loss at a hotspot is quantified as equal to weighted average of the time-series estimator, the temporal estimator, and the spatial estimator.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
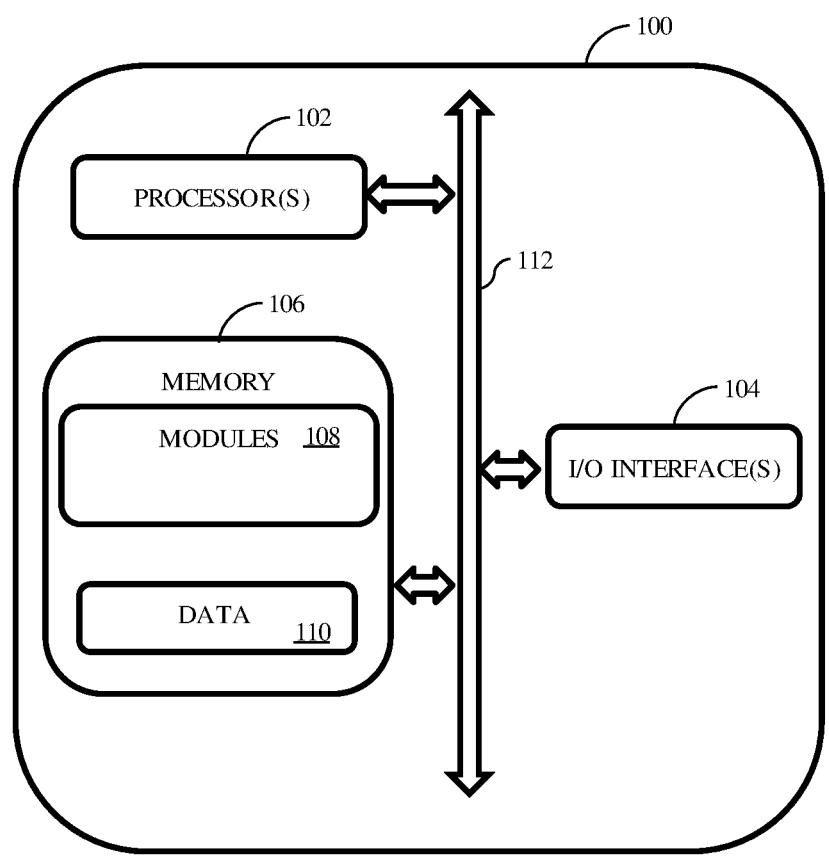
FIG. 1 illustrates an exemplary system for crop loss estimation, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIG. 1 through FIG. 5, where similar reference characters denote corresponding features consistently throughout the figures, there are shown preferred embodiments and these embodiments are described in the context of the following exemplary system and/or method.

FIG. 1 illustrates an exemplary system for crop loss estimation, according to some embodiments of the present disclosure. The system 100 may be implemented in a computing device. Examples of the computing device include, but are not limited to, mainframe computers, workstations, personal computers, desktop computers, minicomputers, servers, multiprocessor systems, laptops, a cellular communicating device, such as a personal digital assistant, a smart phone, and a mobile phone; and the like. The system 100, implemented using the computing device, includes one or more hardware processor(s) 102, IO interface(s) 104, and a memory 106 coupled to the processor 102. The processor 102 can be a single processing unit or a number of units. The hardware processor 102, the memory 106, and the IO interface 104 may be coupled by a system bus such as a system bus 112 or a similar mechanism. The processor 102 may be implemented as one or more microprocessors, microcomputers, microcontrollers, digital signal processors, central processing units, state machines, logic circuitries, and/or any devices that manipulate signals based on operational instructions. Among other capabilities, the processor 102 is configured to fetch and execute computer-readable instructions and data stored in the memory 106.

Functions of the various elements shown in the figures, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or customized, may also be included.

The IO interfaces 104 may include a variety of software and hardware interfaces, for example, interface for peripheral device(s), such as a keyboard, a mouse, an external memory, and a printer. Further, the IO interfaces 104 may enable the computing device to communicate with other computing devices, such as a personal computer, a laptop, and like.

The memory 106 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 106 may also include module(s) 108 and data 110.

The modules 108 may include routines, programs, objects, components, data structures, and so on, which perform particular tasks or implement particular abstract data types. The modules 108 may include programs or computer-readable instructions or coded instructions that supplement applications or functions performed by the system 100. The modules 108 may also be used as, signal processor(s), state machine(s), logic circuitries, and/or any other device or component that manipulates signals based on operational instructions. Further, the modules 108 can be used by hardware, by computer-readable instructions executed by the one or more hardware processors 102, or by a combination thereof. In an embodiment, the modules 108 can include various sub-modules and other module(s) 116. The other module(s) 116 may include programs or coded instructions that supplement applications and functions of the computing device.

The data 110, amongst other things, serves as a repository for storing data processed, received, and generated by one or more of the module(s) 108. The data 110 includes, for example, information on weather data and remote sensing data collected over a period of time, information on classification of crop loss, Weather and Remote Sensing indexes, quantified crop loss, and so on, and other data. The other data includes data generated as a result of the execution of one or more modules in the other module(s).

Figure 2:
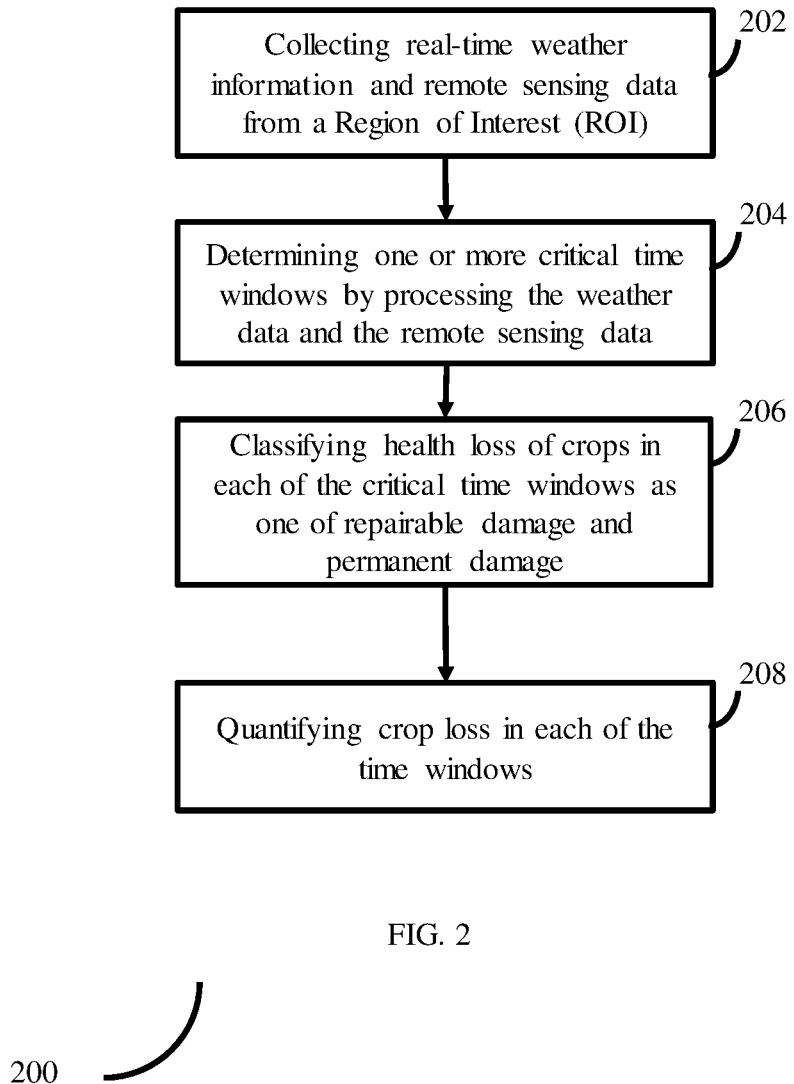
FIG. 2 is a flow diagram depicting steps involved in the process of crop loss estimation, using the system of FIG. 1, according to some embodiments of the present disclosure.

FIG. 2 is a flow diagram depicting steps involved in the process of crop loss estimation, using the system of FIG. 1, according to some embodiments of the present disclosure. In order to perform monitoring of crops in a particular geographic area/region, certain Region of Interest (ROI)s may be selected by a user, using a user interface provided by the I/O interface(s) 104. Each ROI may include a part of a larger geographical area being monitored by the system 100 for crop loss estimation. For convenience, the crop loss estimation process is explained considering a single ROI.

Initially, the system 100 collects (202) real-time weather information and remote sensing data from the ROI. The system 100 may use any appropriate sensors for collecting the real-time weather data. For example, one or more suitable temperature sensors may be used to collect information on atmospheric temperature in the ROI. Similar way, based on other weather parameters required to be collected for the crop loss estimation purpose, using appropriate sensors. To ease the process of covering large geographical areas, the system 100 may rely on the remote sensing data, that may be collected by any suitable means such as but not limited to satellites, drones, and so on.

Figure 3:
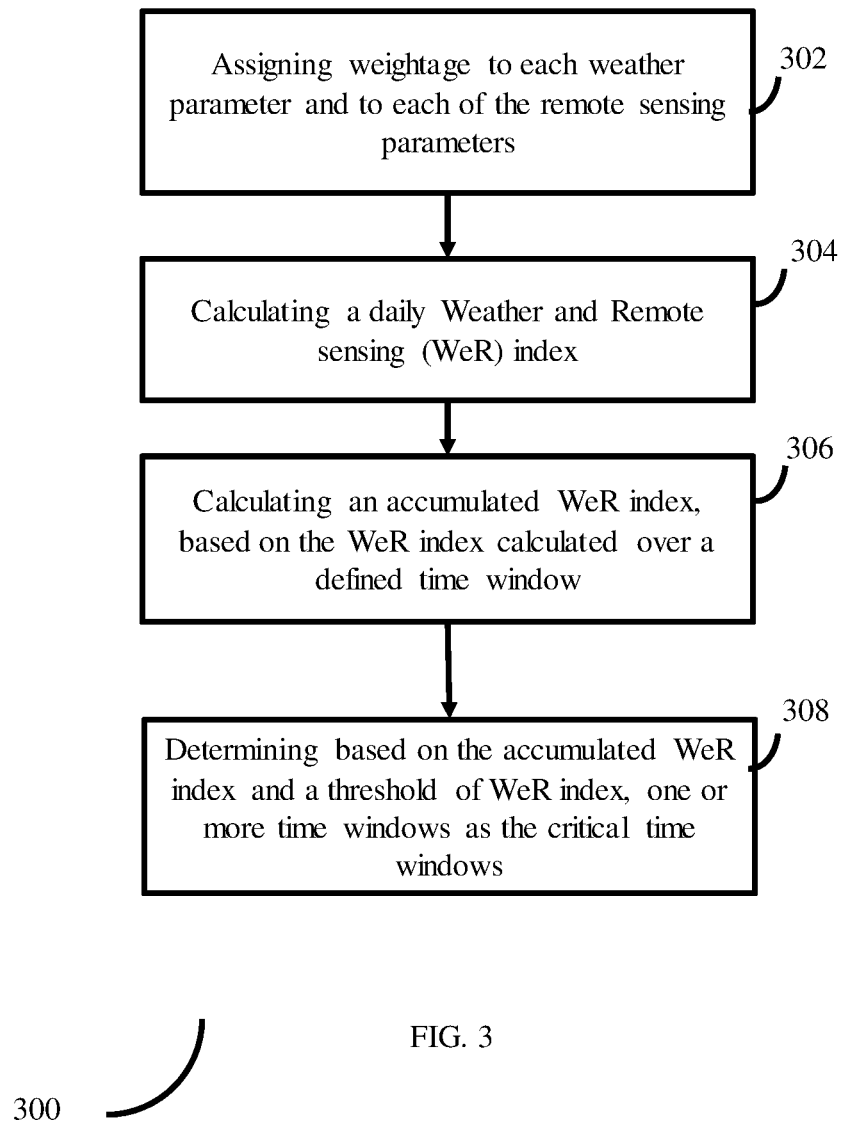
FIG. 3 illustrates a flow diagram depicting steps involved in the process of determining one or more time windows as critical time windows in terms of crop loss, using the system of FIG. 1, in accordance with some embodiments of the present disclosure.

The system 100 processes the collected weather data and the remote sensing data to determine (204) one or more critical time windows, wherein in each of the critical time windows, one or more weather parameters are identified to be outside a normal range of the weather parameter. Steps involved in the process of determining one or more of the time windows as the critical time windows are depicted in FIG. 3, and the steps are elaborated in description of FIG. 3.

Figure 4:
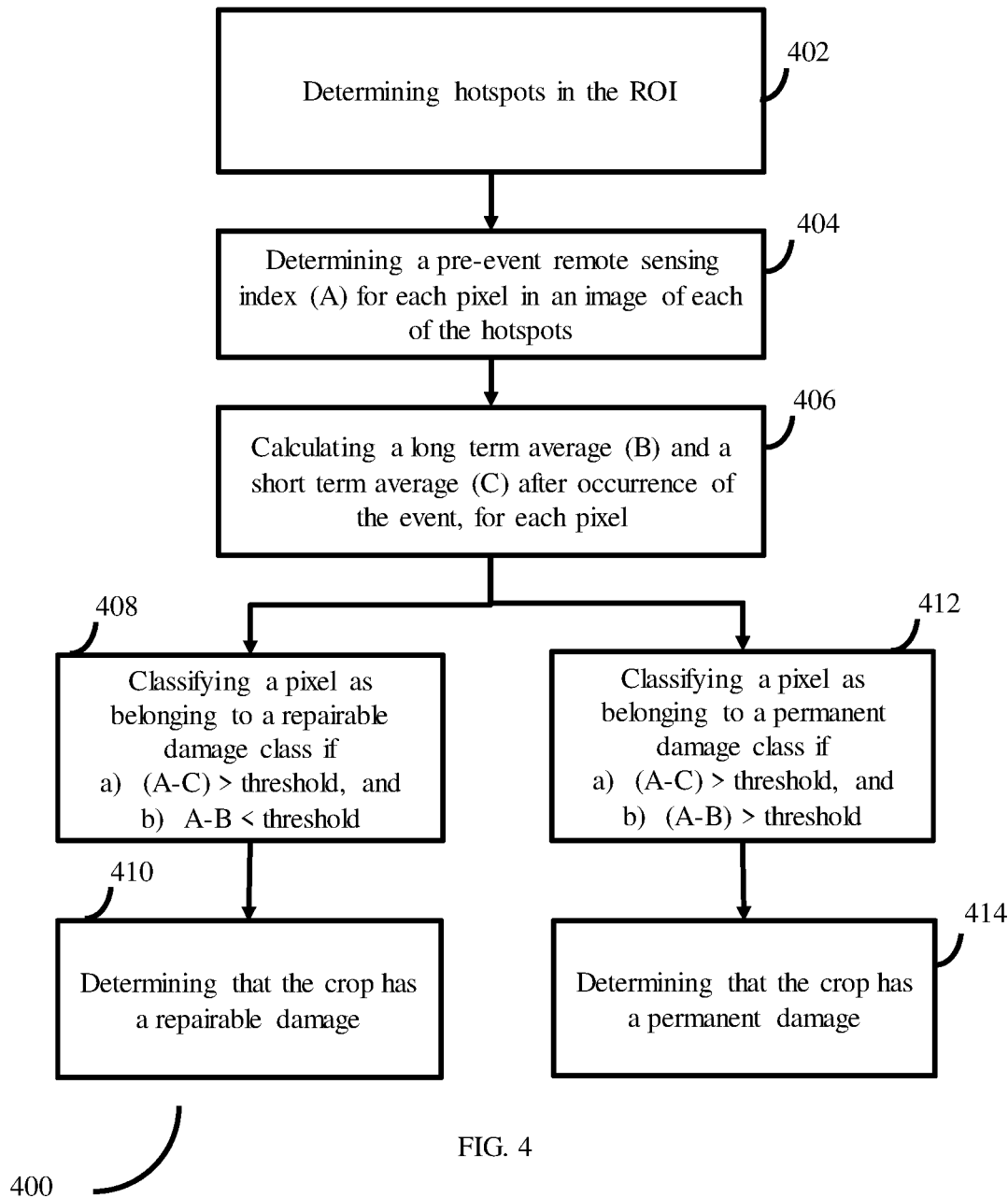
FIG. 4 is a flow diagram depicting steps involved in the process of classifying crops as belonging to one of a permanent damage class and a repairable damage class, using the system of FIG. 1, according to some embodiments of the present disclosure.

The system 100 further processes the real-time data collected for each of the critical time windows, estimates crop loss in each of the critical time windows, and then classifies (206) the crop loss in each of the time windows as one of a repairable damage and a permanent damage. Steps involved in the process of classifying the crop loss in each of the time windows as one of the repairable damage and the permanent damage are depicted in FIG. 4, and the process is explained in description of FIG. 4.

Figure 5:
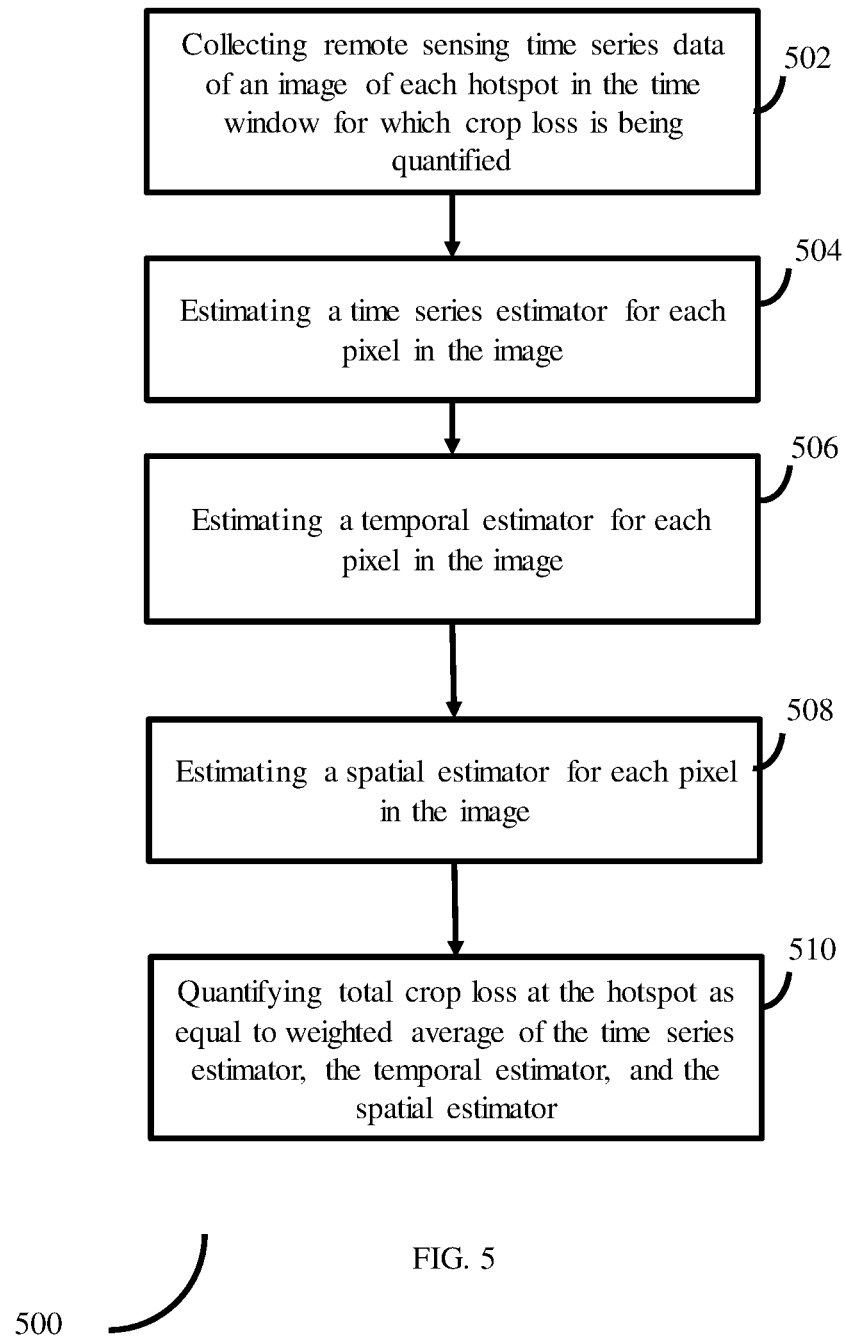
FIG. 5 is a flow diagram depicting steps involved in the process of quantifying crop loss in a time window, using the system of FIG. 1, in accordance with some embodiments of the present disclosure.

The system 100 further quantifies the crop loss in each of the critical time windows. A quantified data of the crop loss, alone or in combination with the classification generated at step 206, can indicate to the user an extent of the crop loss, and this in turn can allow the user to take appropriate measures to save the crops or discard the crops. Steps involved in the process of quantifying the crop loss are depicted in FIG. 5, and the steps are elaborated in description of FIG. 5.

In various embodiments, one or more steps in method 200 may be performed in the same order as depicted in FIG. 2 or in any alternate order that is technically feasible. In another embodiment, one or more steps in method 200 may be omitted.

FIG. 3 illustrates a flow diagram depicting steps involved in the process of determining one or more time windows as critical time windows in terms of crop loss, using the system of FIG. 1, in accordance with some embodiments of the present disclosure. At step 302, the system 100 assigns weightage to each of the weather parameters and the remote sensing data collected in real-time. The weightages for each of the weather parameters and the remote sensing data may be pre-defined based on one or more factors/parameters such as but not limited to type of crops, type of an event (if detected), location information (for example, whether the ROI is in a Agro-Ecological Region/Zone (AER/AEZ) or not), and so on. For example, specific values of weightages for ROI in an AER are pre-defined. While processing the real-time data collected, the system 100 may check whether the ROI from which the data has been collected is in an AER, and if yes, then the corresponding weightages are assigned. Similarly for other factors individually, or for any suitable combination of the one or more factors, the weightages may be defined with the system 100, and the system in turn assigns the weightages.

Further at step 304, the system 100 calculates value of a Weather and Remote Sensing (WeR) index based on the weightages assigned to the weather parameters and the remote sensing data. The system 100 calculates the WeR index continuously for the real-time data collected at different instances over a period of time. The WeR index calculated over a period of time is used by the system 100 to calculate (206) an accumulated WeR index.

At step 308, the system 100 compares the accumulated WeR index with a threshold of WeR index. If the accumulated WeR index exceeds the threshold of WeR index for any time window, that particular time window is determined as a critical time window.

In various embodiments, one or more steps in method 300 may be performed in the same order as depicted in FIG. 3 or in any alternate order that is technically feasible. In another embodiment, one or more steps in method 300 may be omitted.

FIG. 4 is a flow diagram depicting steps involved in the process of classifying crops as belonging to one of a permanent damage class and a repairable damage class, using the system of FIG. 1, according to some embodiments of the present disclosure. At step 402, the system 100 uses a combination of data such as but not limited to crop/growth stage, weather patterns, agro-ecological zones, and type of events, to determine one or more hotspots in each of the critical time windows. Hotspots are the regions/pixels where there is a chance of crop loss, repairable or permanent damage. The system 100 then determines at step 404, a pre-event remote sensing index (A) for each pixel in an image of each of the hotspots. The system 100 further calculates a long term average (B) and a short term average (C). The system 100 then classifies a pixel as belonging to a repairable damage class if (A-C)>threshold, and A-B<threshold. Similarly, the system 100 then classifies a pixel as belonging to a permanent damage class if (A-C)>threshold, and (A-B)>threshold. Value of the threshold may be configured with the system 100, statically or dynamically.

If a pixel or a group of pixels that represent a crop in the image belong to the repairable damage class, then the system 100 classifies health loss/damage of that particular crop as a repairable damage. The 'health loss' of the crop amounts to the crop loss. If a pixel or a group of pixels that represent a crop in the image belong to the permanent damage class, then the system 100 classifies health loss/damage of that particular crop as a permanent damage.

In various embodiments, one or more steps in method 400 may be performed in the same order as depicted in FIG. 4 or in any alternate order that is technically feasible. In another embodiment, one or more steps in method 400 may be omitted.

FIG. 5 is a flow diagram depicting steps involved in the process of quantifying crop loss in a time window, using the system of FIG. 1, in accordance with some embodiments of the present disclosure.

In order to quantify the crop loss in a critical time window, the system 100 collects (502) remote sensing time series data of at least one image of at least one hotspot in the critical time window. The system 100 then estimates a time series estimator for each pixel in the at least one image, wherein the time-series estimator for a pixel is estimated using comparison of a pre-defined time-series of the pixel with a current time series of the pixel. The pre-defined time-series of the pixel may be a historical data collected and maintained by the system 100 in a database in the memory 106. The system 100 then estimates (504) a temporal estimator for each pixel in the at least one image, wherein the temporal estimator for a pixel is estimated based on a long-term temporal average of a crop at a target pixel with a temporal data of the crop at the current pixel. The system 100 further estimates a spatial estimator for each pixel in the at least one image, wherein the spatial estimator for a pixel is estimated based on condition of the pixel in comparison with one or more other pixels in the image of the hotspot. Further, the system 100 quantifies the total crop loss at a hotspot as equal to weighted average of the time-series estimator, the temporal estimator, and the spatial estimator.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of crop loss estimation. The embodiment, thus provides a method and system for classifying damage to health of the crops as one of a permanent damage and a repairable damage. Moreover, the embodiments herein further provides a mechanism to quantify health loss of crops i.e. crop loss.

Example Implementation:

For a given ROI, crops are represented as C1, Agro-Ecological Zone are represented as AE1, and an even that occurred is considered as Drought (D). Weather parameters considered are Temperature (T) with weight Tw and Rainfall (P) with weight Pw, and the remote sensing indicators=NDVI (Nd) with weight Nw and Land Surface Temperature (LST) with weight LSTw.

Daily WeR Index is calculated as:

$$(DWeR\_It1=(T\times Tw)+(P\times Pw)+(Nd\times Nw)+(LST\times LSTw) \quad (1)$$

From the daily WeR indexes collected over a period of time, the accumulated WeR Index is calculated as:

$$AWeR\_Itn=DWeR\_It1+DWeR\_It2+\ldots+DWeR\_Itn \quad (2)$$

Predefined threshold for defined C1 and AE1 is AWIs
Check if AWeR_Itn=>AWeRIs
  then Crop C1 under stress at that pixel
else
  no stress and continue the AWI estimation The process is repeated for all pixels to determine pixels under stress, which are termed as localized hot spots (hot spots).

2. Classifying the Pixels into Repairable and Permanent Damage

Assume a remote sensing variable as NDVI under consideration.

Fixed time series average of NDVI before the event as Pre_NDVI

Pre_NDVI of each pixel is calculated by finding maximum NDVI from selected series (more than three images)

$$Pre\_NDVI=Maximum(NDVI_{t1},NDVI_{t2},NDVI_{t3},\ldots NDVI_{tN}) \quad (3)$$

Short term average of NDVI after the event as Short_NDVI

Short_NDVI of each pixel is calculated by finding maximum NDVI from selected short series (typically two or three images/scenes) after event.

$$Short\_NDVI=Maximum(NDVI_{te1},NDVI_{te2},NDVI_{te3}) \quad (4)$$

Long term average of NDVI after the event as Long_NDVI

Long_NDVI of each pixel is calculated by finding maximum NDVI from selected long series after event (more than three images).

$$Long\_NDVI=Maximum(NDVI_{te1},NDVI_{te2},NDVI_{te3},\ldots NDVI_{teN}) \quad (5)$$

$$NDVI=(NIR-Red)/(NIR+Red) \quad (6)$$

where
NDVI—Normalized Difference Vegetation Index
NIR—Reflectance in Near Infra-red band
Red—Reflectance in Red band
predefined threshold (which is a function of crop, stage, ago-climatic zone) is Pt
if
(Pre_NDVI–Short_NDVI)>Pt AND (Pre_NDVI–Long_NDVI)>Pt
assign it as permanent damage
else
assign it as repairable damage 3. Estimation of Crop Loss Severity for Repairable Damage as Well as Permanent Damage Areas Now, get satellite data for those localized hot spots
Estimators, $$Time\text{-}series\ estimator(Ets)=f(Sts,Ats) \quad (7)$$

Sts—Standard time series of a C1, for AE1
Ats—time-series of a pixel under stress $$Temporal\ Estimator(Et)=f(TAt,Pt) \quad (8)$$

TAt—Long term average of a affected pixel
Pt—value at affected pixel during affected time-period $$\text{Spatial Estimator}(Es) = f(As, Cs) \quad (9)$$

As—Average condition of all affected pixels
Cs—condition of affected pixels under study $$\text{Crop Loss Severity Index}(CLSI) = (Wts \times Ets) + (Wt \times Et) + (Ws \times Es) \quad (10)$$

here Wts, Wt and Ws are the weights for time-series, temporal and spatial estimators The scope loss severity index represents the quantified value that represents total crop loss in the time window considered.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

The invention claimed is:

1. A processor implemented method (200) for crop loss estimation, comprising:
   for each Region on Interest (ROI):
      collecting (202) real-time information on one or more weather parameters, and one or more remote sensing indicators, via one or more hardware processors;
      determining (204) by processing the real-time information on the one or more weather parameters and the one or more remote sensing indicators, one or more critical time windows in at least one later time instance, wherein in each of the one or more critical time windows one or more crops in the ROI suffers a crop loss;
      classifying (206) the crop loss in each of the one or more critical time windows as one of a repairable damage and a permanent damage, via the one or more hardware processors; and
      quantifying (208) crop loss in each of the critical time windows, comprising:
         collecting (502) remote sensing time series data of at least one image of at least one hotspot in the critical time window for which crop loss is to be quantified;
         estimating (504) a time series estimator for each pixel in the at least one image, wherein the time-series estimator for a pixel is estimated using comparison of a pre-defined time-series of the pixel with a current time series of the pixel;
         estimating (506) a temporal estimator for each pixel in the at least one image, wherein the temporal estimator for a pixel is estimated based on a long-term temporal average of a crop at a target pixel with a temporal data of the crop at the current pixel;
         estimating (508) a spatial estimator for each pixel in the at least one image, wherein the spatial estimator for a pixel is estimated based on condition of the pixel in comparison with one or more other pixels in the image of the hotspot; and
         quantifying (510) a total crop loss at a hotspot as equal to weighted average of the time-series estimator, the temporal estimator, and the spatial estimator.

2. The method (200) as claimed in claim 1, wherein determining the one or more critical time windows comprises:
    assigning (302) weightage to each of the one or more weather parameters and to each of the one or more remote sensing indicators, via the one or more hardware processors, based on information on one or more characteristics of the ROI, wherein the one or more characteristics comprise types of crops, Agro-Ecological Zone of the ROI, and information on an event;
    calculating (304) a daily Weather and Remote sensing (WeR) index based on the weather parameters, the remote sensing indicators, and the weightage assigned to the weather parameters and the remote sensing indicators;
    calculating (306) an accumulated WeR index, based on daily WeR index calculated over a defined time window; and
    determining (308) based on the accumulated WeR index and a threshold of WeR index, the one or more critical time windows, in at least one later time instance, wherein in each of the one or more critical time windows one or more crops in the ROI suffers a health loss.

3. The method (200) as claimed in claim 1, wherein classifying the crop loss in each of the one or more time windows as one of the repairable damage and the permanent damage comprises:
    determining (402) one or more hotspots in the ROI, by processing data of the remote sensing indicators and one or more satellite data in each of the one or more critical time windows, wherein each of the one or more hotspots is a part of a geographical area covered by the ROI in which the one or more crops have suffered the health loss;
    classifying health loss of the one or more crops in each of the one or more hotspots as one of the repairable damage and the permanent damage, comprising:
        determining (404) a pre-event remote sensing index for each pixel in an image of each of the hotspots;
        calculating (406) a long term average after occurrence of the event, for each of the pixels;
        calculating (406) a short term average after occurrence of the event, for each of the pixels;
        classifying (408) a pixel as belonging to a repairable damage class if difference between the pre-event remote sensing index and the short term average after the occurrence of the event is higher than a threshold and if difference between the pre-event remote sensing index and the long term average is lower than the threshold;
        classifying (412) a pixel as belonging to a permanent damage class if difference between the pre-event remote sensing index and the short term average after the occurrence of the event is higher than a threshold and if difference between the pre-event remote sensing index and the long term average is higher than the threshold;
        classifying (410) health loss of the one or more crops in the image as the repairable damage if at least one pixel in the image is in the repairable damage class; and
        classifying (412) health loss of the one or more crops in the image as the permanent damage if at least one pixel in the image is in the permanent damage class.

4. A system (100) for crop loss estimation, comprising:
    one or more hardware processors (102);
    one or more communication interfaces (104); and
    one or more memory (106) storing a plurality of instructions, wherein the plurality of instructions when executed cause the one or more hardware processors to perform for each Region on Interest (ROI):
        collecting real-time information on one or more weather parameters, and one or more remote sensing indicators;
        determining by processing the real-time information on the one or more weather parameters and the one or more remote sensing indicators, one or more critical time windows in at least one later time instance, wherein in each of the one or more critical time windows one or more crops in the ROI suffers a health loss;
        classifying the crop loss in each of the one or more critical time windows as one of a repairable damage and a permanent damage; and
        quantifying crop loss in each of the critical time windows, comprising:
            collecting remote sensing time series data of at least one image of at least one hotspot in the critical time window for which crop loss is to be quantified;
            estimating a time series estimator for each pixel in the at least one image, wherein the time-series estimator for a pixel is estimated using comparison of a pre-defined time-series of the pixel with a current time series of the pixel;
            estimating a temporal estimator for each pixel in the at least one image, wherein the temporal estimator for a pixel is estimated based on a long-term temporal average of a crop at a target pixel with a temporal data of the crop at the current pixel;
            estimating a spatial estimator for each pixel in the at least one image, wherein the spatial estimator for a pixel is estimated based on condition of the pixel in comparison with one or more other pixels in the image of the hotspot; and
            quantifying a total crop loss at a hotspot as equal to weighted average of the time-series estimator, the temporal estimator, and the spatial estimator.

5. The system 100 as claimed in claim 4, wherein the system determines the one or more critical time windows by:
    assigning weightage to each of the one or more weather parameters and to each of the one or more remote sensing indicators, via the one or more hardware processors, based on information on one or more characteristics of the ROI, wherein the one or more characteristics comprise types of crops, Agro-Ecological Zone of the ROI, and information on an event;
    calculating a daily Weather and Remote sensing (WeR) index based on the weather parameters, the remote sensing indicators, and the weightage assigned to the weather parameters and the remote sensing indicators;
    calculating an accumulated WeR index, based on WeR index calculated over a defined time window; and
    determining based on the accumulated WeR index and a threshold of WeR index, the one or more critical time windows, in at least one later time instance, wherein in each of the one or more critical time windows one or more crops in the ROI suffers a health loss.

6. The system 100 as claimed in claim 4, wherein the system classifies the crop loss in each of the one or more time windows as one of the repairable damage and the permanent damage by:
   determining one or more hotspots in the ROI, by processing data of the remote sensing indicators and one or more satellite data in each of the one or more critical time windows, wherein each of the one or more hotspots is a part of a geographical area covered by the ROI in which the one or more crops have suffered the health loss;
   classifying health loss of the one or more crops in each of the one or more hotspots as one of the repairable damage and the permanent damage, comprising:
      determining a pre-event remote sensing index for each pixel in an image of each of the hotspots;
      calculating a long term average after occurrence of the event, for each of the pixels;
      calculating a short term average after occurrence of the event, for each of the pixels;
      classifying a pixel as belonging to a repairable damage class if difference between the pre-event remote sensing index and the short term average after the occurrence of the event is higher than a threshold and if difference between the pre-event remote sensing index and the long term average is lower than the threshold;
      classifying a pixel as belonging to a permanent damage class if difference between the pre-event remote sensing index and the short term average after the occurrence of the event is higher than a threshold and if difference between the pre-event remote sensing index and the long term average is higher than the threshold;
      classifying health loss of the one or more crops in the image as the repairable damage if at least one pixel in the image is in the repairable damage class; and
      classifying health loss of the one or more crops in the image as the permanent damage if at least one pixel in the image is in the permanent damage class.

7. A computer program product comprising a non-transitory computer readable medium having a computer readable program embodied therein, wherein the computer readable program, when executed on a computing device, causes the computing device to perform:
   for each Region on Interest (ROI):
      collecting real-time information on one or more weather parameters, and one or more remote sensing indicators, via one or more hardware processors;
      determining by processing the real-time information on the one or more weather parameters and the one or more remote sensing indicators, one or more critical time windows in at least one later time instance, wherein in each of the one or more critical time windows one or more crops in the ROI suffers a crop loss;
      classifying the crop loss in each of the one or more critical time windows as one of a repairable damage and a permanent damage, via the one or more hardware processors; and
      quantifying crop loss in each of the critical time windows, comprising:
         collecting remote sensing time series data of at least one image of at least one hotspot in the critical time window for which crop loss is to be quantified;
         estimating a time series estimator for each pixel in the at least one image, wherein the time-series estimator for a pixel is estimated using comparison of a pre-defined time-series of the pixel with a current time series of the pixel;
         estimating a temporal estimator for each pixel in the at least one image, wherein the temporal estimator for a pixel is estimated based on a long-term temporal average of a crop at a target pixel with a temporal data of the crop at the current pixel;
         estimating a spatial estimator for each pixel in the at least one image, wherein the spatial estimator for a pixel is estimated based on condition of the pixel in comparison with one or more other pixels in the image of the hotspot; and
         quantifying a total crop loss at a hotspot as equal to weighted average of the time-series estimator, the temporal estimator, and the spatial estimator.

8. The computer program product as claimed in claim 7, wherein the computer program product determines the one or more critical time windows by:
   assigning weightage to each of the one or more weather parameters and to each of the one or more remote sensing indicators, via the one or more hardware processors, based on information on one or more characteristics of the ROI, wherein the one or more characteristics comprise types of crops, Agro-Ecological Zone of the ROI, and information on an event;
   calculating a daily Weather and Remote sensing (WeR) index based on the weather parameters, the remote sensing indicators, and the weightage assigned to the weather parameters and the remote sensing indicators;
   calculating an accumulated WeR index, based on daily WeR index calculated over a defined time window; and
   determining based on the accumulated WeR index and a threshold of WeR index, the one or more critical time windows, in at least one later time instance, wherein in each of the one or more critical time windows one or more crops in the ROI suffers a health loss.

9. The computer program product as claimed in claim 7, wherein the computer program product classifies the crop loss in each of the one or more time windows as one of the repairable damage and the permanent damage by:
   determining one or more hotspots in the ROI, by processing data of the remote sensing indicators and one or more satellite data in each of the one or more critical time windows, wherein each of the one or more hotspots is a part of a geographical area covered by the ROI in which the one or more crops have suffered the health loss;
   classifying health loss of the one or more crops in each of the one or more hotspots as one of the repairable damage and the permanent damage, comprising:
      determining a pre-event remote sensing index for each pixel in an image of each of the hotspots;
      calculating a long term average after occurrence of the event, for each of the pixels;
      calculating a short term average after occurrence of the event, for each of the pixels;
      classifying a pixel as belonging to a repairable damage class if difference between the pre-event remote sensing index and the short term average after the occurrence of the event is higher than a threshold and if difference between the pre-event remote sensing index and the long term average is lower than the threshold;

classifying a pixel as belonging to a permanent damage class if difference between the pre-event remote sensing index and the short term average after the occurrence of the event is higher than a threshold and if difference between the pre-event remote sensing index and the long term average is higher than the threshold;

classifying health loss of the one or more crops in the image as the repairable damage if at least one pixel in the image is in the repairable damage class; and classifying health loss of the one or more crops in the image as the permanent damage if at least one pixel in the image is in the permanent damage class.

\* \* \* \* \*